US006789577B2

(12) United States Patent

Baltes

(10) Patent No.: US 6,789,577 B2
(45) Date of Patent: Sep. 14, 2004

(54) HYDROPNEUMATIC PRESSURE ACCUMULATOR

(75) Inventor: Herbert Baltes, Losheim (DE)

(73) Assignee: Hydac Technology GmbH, Sulzbach/saar (DE)

(*) Notice: Subject to any disclaimer, the term of this patent is extended or adjusted under 35 U.S.C. 154(b) by 56 days.

(21) Appl. No.: 10/096,101

(22) Filed: Mar. 13, 2002

(65) Prior Publication Data

US 2002/0134446 A1 Sep. 26, 2002

(30) Foreign Application Priority Data

Mar. 20, 2001 (DE) ........................................ 101 13 415

(51) Int. Cl.[7] ................................................ F16L 55/04
(52) U.S. Cl. .................................. 138/30; 138/DIG. 3
(58) Field of Search ....................... 138/26, 30, DIG. 3

(56) References Cited

U.S. PATENT DOCUMENTS 3,063,470 A * 11/1962 Forster ........................ 138/30
3,143,144 A * 8/1964 Peet ............................ 138/30
3,348,578 A * 10/1967 Mercier ....................... 138/30
4,166,478 A * 9/1979 Sugimura et al. ............. 138/30
4,448,217 A * 5/1984 Mercier ....................... 138/30
4,610,369 A * 9/1986 Mercier ...................... 220/721
4,628,964 A * 12/1986 Sugimura et al. ............. 138/30
4,732,176 A * 3/1988 Sugimura .................... 138/30
5,505,228 A * 4/1996 Summerfield ................ 138/30
5,860,452 A * 1/1999 Ellis ............................ 138/30
6,017,099 A * 1/2000 Schneider et al. ............ 303/87
6,131,613 A * 10/2000 Jenski, Jr. et al. ............ 138/30
6,314,942 B1 * 11/2001 Kilgore et al. .............. 123/467

* cited by examiner

*Primary Examiner*—James Hook
(74) *Attorney, Agent, or Firm*—Roylance, Abrams, Berdo & Goodman L.L.P.

(57) ABSTRACT

A hydropneumatic pressure accumulator has an outer tube forming the accumulator housing. A flexible separating element is formed by a section of a hose, extends in the longitudinal direction inside of the outer tube and is anchored on the tube to form a seal. On the outside and inside of the hose, receiving spaces separated from one another are formed within the tube. A support body is surrounded by the hose and has fluid passages. At least in sections, the support body cross sectional shape is not round. The hose is closed on its one end and is anchored only on its other open end together with an adjacent end of the support body along the outer tube. The size of the outside surface of the hose is only slightly smaller than the size of the inside surface of the outer tube facing it. The size of the outside surface of the support body is slightly smaller than that of the inside surface of the hose facing it.

16 Claims, 2 Drawing Sheets

HYDROPNEUMATIC PRESSURE ACCUMULATOR

FIELD OF THE INVENTION

The present invention relates to a hydropneumatic pressure accumulator with an outer tube forming the accumulator housing. In the housing, a flexible separating element is formed by a section of a hose extending in the longitudinal direction of the tube. The hose is anchored on the tube, forming a seal, such that on the outside and inside of the hose, receiving spaces are formed within the tube which are each separate from one another. The hose surrounds a support body having fluid passages and having at least in sections a cross sectional shape which is not round.

BACKGROUND OF THE INVENTION

A pressure accumulator is disclosed in DE 1 165 362, particularly FIGS. 5 and 6. To prevent damage due to overloading of a hose forming the separating element between the receiving spaces, i.e., the gas chamber and the oil chamber of the pressure accumulator, during operation the pressure accumulator must be carefully watched such that allowable operating limits are not exceeded. In other words, the value of the allowable pressure ratios between the upper operating pressure $p_2$ and the gas pretensioning pressure $p_0$ resulting from the limits of the load capacity of the hose which is conventionally made of rubber would not be as high as would be desirable. In the conventional state-of-the art solution, stresses occur, especially in the form of cyclic bending stresses, at the clamping site. Over a longer time interval, such high dynamic stresses occur that material fatigue and ultimately material failure occur.

SUMMARY OF THE INVENTION

Objects of the present invention are to provide a pressure accumulator formed of a flexible hose in a tube having better operating behavior, especially a higher allowable pressure ratio, than conventional designs of such accumulators.

The foregoing objects are achieved for the present invention in that the hose is closed on one end and is anchored only on its other open end together with the adjacent end of the support body along the outer tube. The size of the outside surface of the hose is only slightly smaller than the size of the inner surface of the outer tube facing it.

The only "one-sided" clamping of the hose, forming the separating element and being open on only one side, together with the dimensioning of the areas of the surfaces of the hose and outer tube which correspond to one another, leads to the especially advantageous result that the hose in operation is hardly exposed to any tensile or bending forces which would be active at the anchoring site. Due to the dimensioning of the sizes of the corresponding surfaces according to the present invention, for example in operating states in which a gas-pretensioning pressure ($p_0$) acting on the outside of the hose exceeds the prevailing operating pressure, or in which there is no operating pressure, the hose is guided adjoining the support body free of tensile stress and free of flattening. This guiding permits the pressure accumulator to be handled without difficulty in the prefilled state with the oil side unpressurized. Based on the arrangement of the present invention, distinctly increased alternating load numbers can be achieved without material failure. If, on the other hand, a loss of the pretensioning pressure ($p_0$) should occur so that the gas side of the pressure accumulator becomes unpressurized, at the intended dimensioning, the hose is in contact with the inner surface of the outer tube without tensile stresses. In normal operation between these two extreme states, the hose in the free space between the support body and the outer tube in turn occupies the position which corresponds to pressure equalization without tensile stresses. As a result, the limit for the level of the allowable upper operating state ($p_2$) is determined solely by the structural strength of the accumulator housing formed by the outer tube.

For dimensioning of the size of the outside surface of the support body relative to the facing inside surface of the hose, the size of the outside surface of the support body can be only slightly less than that of the inside surface of the hose facing it. In this case, the hose surrounds the support body comparatively loosely, i.e., that in the operating state in which the pretensioning pressure ($p_0$) exceeds the operating pressure (p) or in the absence of operating pressure, the hose makes contact with the outside surface of the support body without tensile stress.

Alternatively, the arrangement can be made such that the outside surface of the support body is somewhat larger than the inside surface of the hose when the latter is in the unexpanded state. In this case, the hose is slightly pretensioned in all operating states.

The inner support body can be made in the form of a tube body having openings in the wall and indentations over most of its length between its two end areas. The indentations reduce the tube cross section, but not the area of the outside surface of the tube body. The compression or squeezing of the tube body which takes place in areas reduces the volume of the receiving space within the hose, normally the oil chamber. The maximum useful $\Delta V$ of the tube accumulator is also hereby determined.

In preferred exemplary embodiments, the tube body is shaped and dimensioned in such a way that it extends in its end areas which are free of indentations along the inside surface of the outer tube, and, from this surface, at a distance which corresponds essentially to the thickness of the hose. In this way the hose in these surface areas is guided both on its inside, specifically on the tube body, and also on its outside, specifically by contact with the inside surface of the outer tube.

Preferably, the outside surface of the tube body in the longitudinal area having the indentations on the longitudinal extending peripheral areas of the outer tube is at a distance from its inside surface which corresponds essentially to the thickness of the hose. In this manner, it is also guided in areas over its entire longitudinal area between the tube body and the outer tube.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 2:
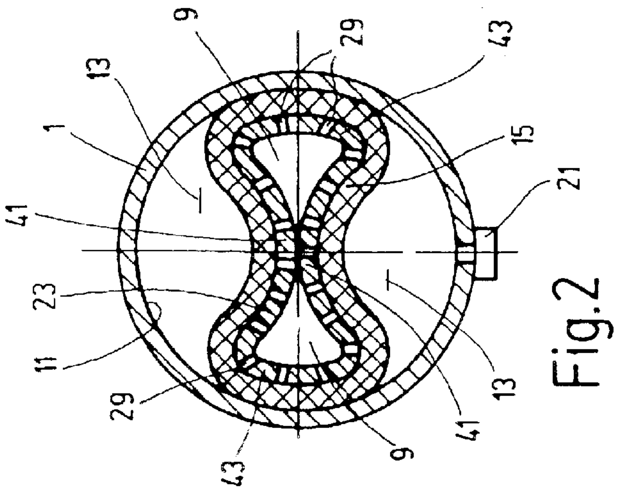
FIG. 2 is an end view in section of the pressure accumulator taken along line II—II of FIG. 1.
Figure 1:
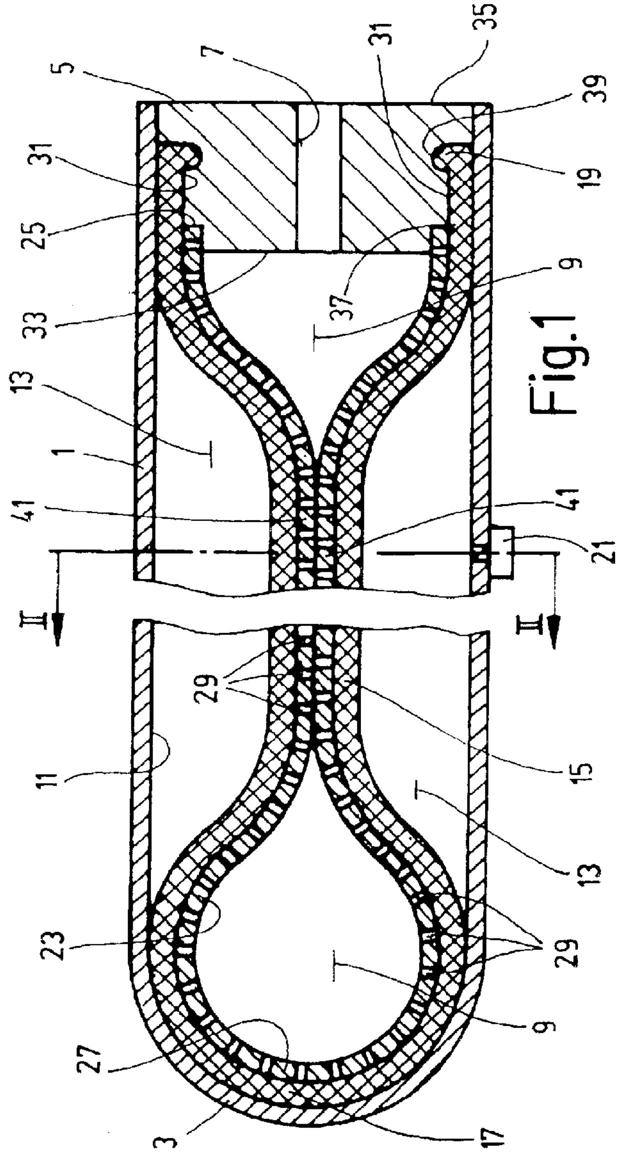
FIG. 1 is a schematic side elevational view in longitudinal section of a pressure accumulator according to a first embodiment of the present invention.

The first embodiment of the pressure accumulator of the present invention shown in FIGS. 1 and 2 has a metallic accumulator housing in the form of a tube 1. On its end on the left side in FIG. 1, the tube is closed by a wall part 3 curved to the outside of the tube. The tube 1, as shown in FIG. 2, has a circular transverse cross section. The curved wall part 3 on the closed tube end is accordingly hemispherical. In the embodiment shown, the end-side wall part 3 is made in one piece or unitarily with the remaining tube 1 by means of a deep drawing or extrusion process. However, at greater structural lengths, the end-side wall part 3 can be a separate component attached by welding.

On the open end which is on the right side in FIG. 1, the tube 1 is closed by a pressed-in closing component 5 having a central through hole 7 forming a passage leading to the inner receiving space of the pressure accumulator. In this exemplary embodiment, the receiving space into which the hole 7 discharges or opens is the oil chamber 9 of the pressure accumulator. The fitting to be attached to the outer end of the hole 7 for the corresponding oil connection is not shown. The hole 7 could also be located off-center.

The oil chamber 9 is separated relative to the gas chamber 13 which directly borders the inside surface 11 of the tube by a flexible separating element in the form of a hose 15. Hose 15 is closed on its end 17 which is on the left side in FIG. 1, and is anchored with its end 19 which is on the right side in FIG. 1 on the closing component 5, to be described in detail below. A gas valve 21 enables filling of the gas chamber 13 to build up the desired pretensioning pressure ($p_0$).

Hose 15 is formed of elastomeric material, for example, a rubber material. In its interior, a tube support body 23 for hose 15 extends which is open on the end 25 adjacent to the open end 19 of the hose 15 and which is closed on its opposite end 27. Closed end 27 has a shape which is curved hemispherically and is adapted to the end-side wall part 3 of the outer tube 1, and extends with its outside surface at a distance from the inside surface of the wall part 3 on the outer tube 1 corresponding to the thickness of the hose 15. Therefore, hose 15 is guided or retained adjoining both the outer tube 1 and also the inner tube body 23 in the pertinent area. The wall of the tube body 23 has through holes 29 distributed uniformly and forming the fluid passages from the oil chamber space 9 to the inside of the hose 15. At higher pressures, through holes 29 can be non-uniformly arranged, and especially provided on one side and/or at the lowest part of the pressure accumulator.

The open end 25 of the tube body 23 opposite the closed end 27 is anchored together with the assigned or adjacent end 19 of the hose 15 in a recess 31 machined in the closing component 5. The recess 31 is machined into the peripheral surface of the closing component 5 such that it extends from the inner end face 33 facing the oil chamber 9 into the vicinity of the outer end face 35. Bordering the inner end face 33, the recess 31 has a step 37 into which the end 25 of the tube body 23 fits. On the end area adjacent to the outer end face 35, the recess 31 has an annular groove 39 which extends radially inward and in which the folded-over end 19 of the hose 15 is held. Hose 15 extends along the inside surface of the outer tube 1 beyond the area of the step 37 within the recess 31. The closing component 5 forms a clamp body which is pressed into the outer tube 1 and which anchors fluid-tight the tube body 23 fitting into the area of the step 37 of the recess 31. The end of the hose 5 extends in the recess 31 as far as the groove 39 and fits over this area, along the inside surface of the outer tube 1. Instead of the folded end 19, a sealing and fixing bead on the free end of the hose 15 can also be obtained via its formation as an independent molded part.

As is most clearly shown in FIG. 2, the tube body 23 is crimped or squeezed out of its original circular cross-sectional shape in its longitudinal area located between the ends 25 and 27 from the two opposing sides such that two indentations 41 extending longitudinally are formed. Therefore, a noncircular cross-sectional shape in the form of an "8" is formed. As is apparent from the Figures, the indentations 41 are crimped so far that the walls of the tube body 23 essentially touch one another in the area of the greatest depth of the indentations, i.e. along the central longitudinal axis of the tube body 23. In the areas 43 which are not crimped and which are located laterally from the indentations 41 (see FIG. 2), the outside surface of the tube body 23 extends, like the area of the spherical end 27, along the inside surface of the outer tube 1 at a distance which corresponds essentially to the thickness of the hose 15. The entire outside surface of the tube body 23 is therefore slightly smaller than the facing inside surface 11 of the outer tube 1. The primary sealing function is achieved, preferably via the respective end-side, bead-like configuration of the hose 15.

FIGS. 1 and 2 show the operating state in which the pretensioning pressure $p_0$ in the gas chamber 13 is greater than or equal to the pressure in the oil chamber 9. The dimensioning of the sizes of the facing surfaces of the tube body 23 and of the hose 15 are chosen such that the hose 15 is guided over the entire outside surface of the tube body 23, adjoining it. If the operating pressure $p_1$ prevailing in the oil chamber 9 exceeds the pretensioning pressure $p_0$ in the gas chamber 13, the hose 15 is lifted off the tube body 23 to reduce the volume of the gas chamber 13 until pressure equilibrium is reached. As a result of the only one-sided clamping on the closing component 5, movement of the hose 15 takes place without the tensile or bending forces acting at the clamping site. Even in the absence of pretensioning pressure in the gas chamber 13, no overloading of the hose 15 occurs, since in the dimensioning provided for the present invention, where the size of the outside surface of the hose 15 is chosen to be only slightly smaller than the size of the facing inside surface 11 of the outer tube 1, the hose adjoins the outer tube 1 essentially without tensile stress on the inside surface. The magnitude of the pressure ratio $p_2/p_0$ in the design of the present invention is essentially limited only by the structural strength of the accumulator housing (tube 1) and the rate of pressure increase which may occur, by which a corresponding compression heat is produced.

In the illustrated arrangement of the gas chamber 13 on the outside of the hose 15, the magnitude of the allowable pretensioning pressure $p_0$ is still dependent on the size of the through holes 29 in the tube body 23. A diameter is chosen such that the material of the hose 15 cannot be pressed into the holes 29. Due to the same surface geometries, tensile stress is eliminated so that tensile and bending forces caused by the motion of the hose 15 are clearly minimized.

Since the hose 15 is not exposed to strong bending stress, the material for the hose 15 can also be material of low extensibility, for example plastic materials such as PTFE. The oil chamber and gas chamber can also be interchanged compared to the arrangement shown in the Figures. The tube body 23 can be a metallic tube which is mechanically compressed to form the indentations 41. It can also be shaped as a plastic injection molding or can also be formed by a screen-like part, wire mesh or the like.

Figure 3:
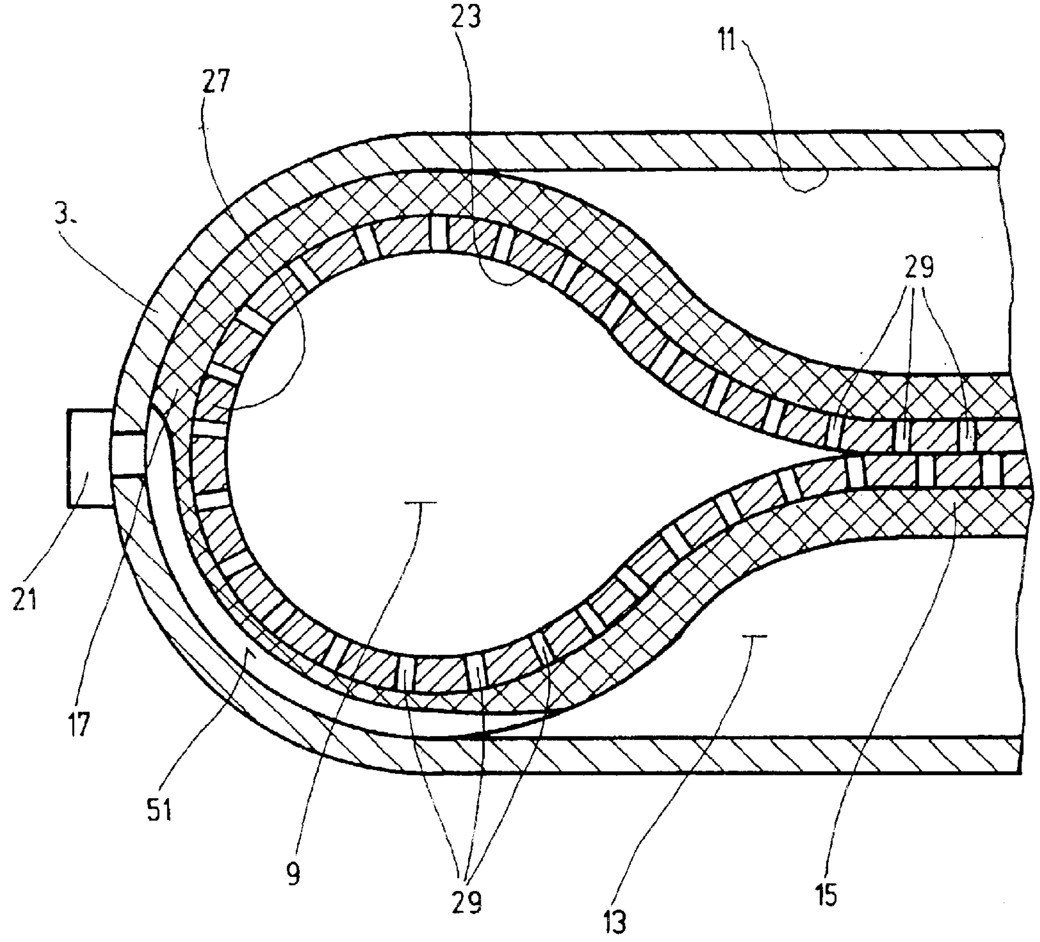
FIG. 3 is a partial side elevational view in longitudinal section at one end of a pressure accumulator according to a second embodiment of the present invention.

FIG. 3 shows a second embodiment, modified relative to the example from FIGS. 1 and 2, such that the gas valve 21 is now located centrally on the wall part 3 forming the end-side termination of the tube 1. This arrangement has the advantage that there is no projection on the lateral outline of the housing formed by the tube 1.

In this arrangement of the gas valve 21, the hose 15, on its outside surface in the area extending from the closed end 17 at the discharge site of the gas valve 21 to the area of the gas chamber 13 which borders the indentation area of the tube body 23, is provided with at least one channel-like recess. The recess forms a channel 51 providing a passage to the gas chamber 13.

Figure 4:
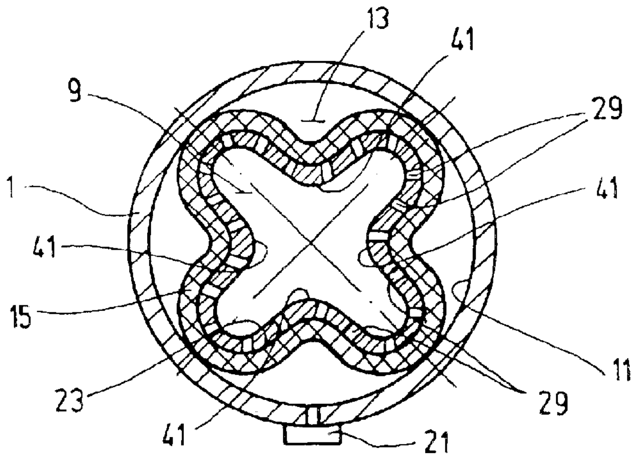
FIG. 4 is an end elevational view in section of a pressure accumulator according to a third embodiment of the present invention.

While FIGS. 1 to 3 show exemplary embodiments in which the tube body 23 is crimped only from two opposing sides so that two longitudinally-extending indentations 41 are formed, FIG. 4 shows a third embodiment in which the tube body 23 is crimped from four sides so that four indentations 41 are formed. Two indentations at a time are opposite one another in pairs. As in the previous examples, the original round cross section of the tube body 23 is deformed here into a noncircular, star-like transverse cross-sectional shape. This body configuration provides a reduced internal space, without reducing the size of the outside surface forming the contact surface for the hose 15. The areas which are not crimped and which are located laterally relative to the indentations 41 provide the outside surfaces of the tube body 23 extending in the same way as in the above described exemplary embodiments, i.e., along the inside surface of the outer tube 1 at a distance which corresponds to the thickness of the hose 15. The most deeply crimped areas of the indentations 41 are not brought together until they touch, but extend at a radial distance to the central longitudinal axis of the accumulator housing defined by the outer tube 1. Otherwise, the tube body 23 in the embodiment of FIG. 4 in the end areas which are not crimped and which are adjacent to the ends of the outer tube 1 are made analogously, as in the embodiments from FIGS. 1 to 3.

It is understood that other shapes of the tube body 23 and a different number of indentations can also be used. The pressure accumulator of the present invention can be used for energy storage, for example, in conjunction with motor vehicle spring suspension systems or also as pulsation dampers. Furthermore, the approach of the present invention is especially suited for damping of pressure peaks in hydraulic or other fluid-engineering systems. In all cases the pressure accumulator of the present invention is characterized by a long service life, which is ensured as a result of the low stresses on the hose which occur during operation.

While various embodiments have been chosen to illustrate the invention, it will be understood by those skilled in the art that various changes and modifications can be made therein without departing from the scope of the invention as defined in the appended claims.

What is claimed is:

1. A hydropneumatic pressure accumulator, comprising:

an accumulator housing formed by an outer tube having an inside surface;

a flexible separating element located in said outer tube and formed by a section of hose extending along a longitudinal axis of said outer tube, said hose having a closed longitudinal end, an open longitudinal end and an outside surface;

a seal between said hose and said outer tube to provide inner and outer receiving spaces inside and outside said hose, respectively, separated by said hose within said outer tube;

a support body surrounded by said hose and having fluid passages and sections which are non-round in cross-sectional shape, said support body including a tube body with openings in a wall thereof and with indentations in a longitudinal area thereof reducing a cross section of said tube body on a majority of a length thereof between end areas thereof, said end areas of said tube body being free of indentations, extending along said inside surface of said outer tube and being spaced from said inside surface of said outer tube at a distance corresponding essentially to a thickness of said hose, said closed longitudinal end of said hose being between said end areas of said tube body and said inside surface of said outer tube; and an anchoring on said open end only coupling said open end and an adjacent end of said support body along said outer tube, said outside surface of said hose being only slightly smaller than said inside surface of said outer tube facing said outside surface.

2. A hydropneumatic pressure accumulator according to claim 1 wherein said support body has an outside surface only slightly smaller than a facing inside surface of said hose.

3. A hydropneumatic pressure accumulator according to claim 1 wherein said support body has an outside surface slightly larger than a facing inside surface of said hose.

4. A hydropneumatic pressure accumulator according to claim 1 wherein said outer tube comprises a closed end adjacent to said closed longitudinal end of said hose.

5. A hydropneumatic pressure accumulator according to claim 4 wherein a gas valve is on said closed end of said outer tube; and said outside surface of said hose adjacent said valve comprises a channel shaped depression forming a conduit from said gas valve to a gas chamber formed by one of said receiving spaces.

6. A hydropneumatic pressure accumulator according to claim 1 wherein said longitudinal area of said tube body comprises longitudinally extending areas spaced a distance from said inside surface of said outer tube corresponding essentially to said thickness of said hose, with hose being between said longitudinally extending areas and said inside surface of said outer tube.

7. A hydropneumatic pressure accumulator according to claim 1 wherein a wall part closes an end of said outer tube adjacent said closed longitudinal end of said hose, and is curved to an exterior of said outer tube; and said tube body has a correspondingly curved closed end.

8. A hydropneumatic pressure accumulator according to claim 4 wherein a closing component closes an end of said outer tube opposite said closed end of said hose forming said anchoring and said seal, said open longitudinal end of said hose being sealed to said inside surface of said outer tube by said closing component, an inside surface of said hose being sealed to said closing component.

9. A hydropneumatic pressure accumulator according to claim 1 wherein said support body has two of said indentations extending longitudinally opposite one another, flush with one another and extending continuously between said end areas of said support body.

10. A hydropneumatic pressure accumulator according to claim 9 wherein said two indentations have equal depths and regions of opposite walls thereof brought closest to one another, and extending on parts of lengths thereof at a narrow, mutual distance.

11. A hydropneumatic pressure accumulator according to claim 9 wherein said two indentations have equal depths and regions of opposite walls thereof brought closest to one another and extend on parts of lengths thereof adjoining one another.

12. A hydropneumatic pressure accumulator according to claim 1 wherein said indentations extend longitudinally and are distributed along a periphery thereof.

13. A hydropneumatic pressure accumulator according to claim 12 wherein said indentations are arranged opposite one another in pairs.

14. A hydropneumatic pressure accumulator according to claim 1 wherein said hose is made of a material of a low extensibility.

15. A hydropneumatic pressure accumulator according to claim 14 wherein said material is PTFE.

16. A hydropneumatic pressure accumulator, comprising:

an accumulator housing formed by an outer tube having an inside surface and a closed end;

a flexible separating element located in said outer tube and formed by a section of hose extending along a longitudinal axis of said outer tube, said hose having a closed longitudinal end adjacent said closed end of said outer tube, an open longitudinal end and an outside surface;

a seal between said hose and said outer tube to provide inner and outer receiving spaces inside and outside said hose, respectively, separated by said hose within said outer tube;

a support body surrounded by said hose and having fluid passages and sections which are non-round in cross-sectional shape;

an anchoring on said open end coupling said open end and an adjacent end of said support body along said outer tube, said outside surface of said hose being only slightly smaller than said inside surface of said outer tube facing said outside surface; and a gas valve on said closed end of said outer tube, said outside surface of said hose adjacent said valve including a channel shaped depression forming a conduit from said gas valve to a gas chamber formed by one of said receiving spaces.

* * * * *